(12) United States Patent
Kuenne (10) Patent No.: US 10,675,654 B2
(45) Date of Patent: Jun. 9, 2020

(54) MULTI-LAYER SLOT DIE SYSTEM AND METHOD

(71) Applicant: NORDSON CORPORATION, Westlake, OH (US)

(72) Inventor: David J. Kuenne, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 177 days.

(21) Appl. No.: 15/447,006

(22) Filed: Mar. 1, 2017

(65) Prior Publication Data
US 2018/0250701 A1 Sep. 6, 2018

(51) Int. Cl.
*B05C 5/02* (2006.01)
*B29C 48/31* (2019.01)
(Continued)

(52) U.S. Cl.
CPC ............ *B05C 5/0262* (2013.01); *B05C 5/027* (2013.01); *B29C 48/2566* (2019.02);
(Continued)

(58) Field of Classification Search
CPC .. B05C 5/00; B05C 5/02; B05C 5/027; B05C 5/0262; B05C 5/0254; B05C 9/06; B05C 19/06; B29C 47/12; B29C 48/2566; B29C 48/302; B29C 48/31; B29C 48/313; B29C 48/307; B29C 48/4816; B29C 48/4818;
(Continued)

(56) References Cited

U.S. PATENT DOCUMENTS 5,425,967 A * 6/1995 Tomaru ................ B05C 5/0254
118/411
5,733,605 A * 3/1998 Akiyama ............. B05C 5/0254
118/411
(Continued)

FOREIGN PATENT DOCUMENTS

| EP | 1987941 A1 * | 5/2008 |
| JP | 2004-066016 A | 3/2004 |
| JP | 2007-014893 A | 1/2007 |

OTHER PUBLICATIONS

European search report dated Oct 25, 2018 for EP Application No. 18159546.

*Primary Examiner* — Laura Edwards
(74) *Attorney, Agent, or Firm* — Baker & Hostetler LLP (57) ABSTRACT

A multi-layer slot die and method are provided. The multi-layer slot die comprises an upper body member, a lower body member, and a center body member. The upper body member has an upper surface and an upper rear surface. The lower body member has a lower surface and a lower rear surface. The center body has an upper center surface, a lower center surface, and a center rear surface. The upper center surface is spaced apart from the upper surface of the upper body member forming a first channel therebetween. The lower center surface is spaced apart from the lower surface of the lower body member forming a second channel therebetween. The first channel includes a first opening and the second channel includes a second opening. The first and second openings are substantially parallel to the upper rear surface, the lower rear surface, and the center rear surface.

16 Claims, 9 Drawing Sheets

(51) Int. Cl.
*B29C 48/25* (2019.01)
*B29C 48/30* (2019.01)
*B05C 9/06* (2006.01)
*B05D 7/00* (2006.01)
*B05D 1/26* (2006.01)

(52) U.S. Cl.
CPC .......... *B29C 48/302* (2019.02); *B29C 48/313* (2019.02); *B05C 9/06* (2013.01); *B05D 1/26* (2013.01); *B05D 7/5485* (2013.01)

(58) Field of Classification Search
CPC ..... B29C 48/4821; B29C 48/18; B29C 48/21; Y10S 118/04; G11B 5/848; G01N 2021/8438
USPC ..... 118/411, 412; 425/466, 467, 133.5, 190, 425/192 R
See application file for complete search history.

(56) References Cited

U.S. PATENT DOCUMENTS

| | | | | |
|---|---|---|---|---|
| 6,159,544 A | * | 12/2000 | Liu | B05C 5/027 118/407 |
| 2004/0241327 A1 | * | 12/2004 | Wyatt | B05C 5/001 427/355 |

\* cited by examiner

MULTI-LAYER SLOT DIE SYSTEM AND METHOD

TECHNICAL FIELD

The present disclosure relates to slot dies, and more particularly, to an improved multi-layer slot die and a method of using the multi-layer slot die.

BACKGROUND

Slot dies are used for applying thin fluid coatings across a wide range of substrates, and can include single-layer or multi-layer dies. A single-layer slot die applies a single layer of fluid onto a substrate, whereas a multi-layer slot die applies at least two layers of fluid onto a substrate. The fluid is forced out of a reservoir through a slot to a lip face by pressure, and transferred to a moving substrate. Generally, the slot is significantly smaller in section than the reservoir and is oriented perpendicular to the direction of substrate movement.

To change the amount of fluid being applied to the substrate, the size of the slot can be adjusted. Different thicknesses of shims placed between two body sections or a mechanical slot adjustment are used to increase or decrease the size of the slot. A thick shim can be used to increase the size of the slot, and conversely, a thin shim can be used to decrease the size of the slot. In conventional multi-layer slot dies, if the size of one or more of the slots is adjusted by a shim, the lip face where the fluid is extruded becomes offset. An operator must then use a chart or calculation to eliminate or compensate for the lip face offset. Also, since the plane of the offset surface is perpendicular to the mating surface of the body sections and not parallel to the lip face, the operator must also calculate the offset shim thickness to achieve the desired lip offset. This process can be time consuming and requires additional equipment to ensure that the slot die maintains a desired lip offset.

Therefore, there is a need for an improved slot die and method for adjusting the coating gaps and lip offsets within the slot die.

SUMMARY

Disclosed herein are multi-layer slot dies and methods for using multi-layer slot dies for dispensing two or more fluids. Unlike prior dies, the multi-layer slot die described herein minimizes operator time to align, adjust, or orient the multi-layer slot die after the width of the slot is adjusted as the opening of the slots are substantially vertical and parallel.

In one aspect, the multi-layer slot die includes a center body member, an upper body member and a lower body member. The center body member has an upper center surface, a lower center surface, and a center rear surface. The upper body member has an upper surface and an upper rear surface. The upper surface is spaced apart from the upper center surface forming a first channel therebetween, where the first channel includes a first opening at a dispensing end of the multi-layer slot die. The upper body member is configured to move between a first position and a second position, where in the first position, the upper surface is spaced apart from the upper center surface by a first distance, and where in the second position, the upper surface is spaced apart from the upper center surface by a second distance that is different from the first distance. The first opening is substantially parallel to both the center rear surface and the upper rear surface in both the first and second positions of the upper body member. The lower body member has a lower surface and a lower rear surface. The lower surface is spaced apart from the lower center surface forming a second channel therebetween. The second channel includes a second opening at the dispensing end that is substantially parallel to the first opening and the lower rear surface in both the first and second positions of the upper body member.

In another aspect, the multi-layer slot die includes an upper body member, a lower body member, and a center body member. The upper body member has an upper surface and an upper rear surface. The lower body member has a lower surface and a lower rear surface. The center body member is positioned at least partially between the upper body member and the lower body member. The center body member has an upper center surface, a lower center surface, and a center rear surface. The upper center surface is spaced apart from the upper surface of the upper body forming a first channel therebetween. The lower center surface is spaced apart from the lower surface of the lower body forming a second channel therebetween. The first channel includes a first opening at a dispensing end of the multi-layer slot die. The second channel includes a second opening at the dispensing end of the multi-layer slot die. The first and second openings are substantially parallel to the upper rear surface, the lower rear surface, and the center rear surface.

Another aspect of the present disclosure provides a method for dispensing a first fluid and a second fluid from a multi-layer slot die. The method comprises dispensing the first fluid through a first opening of a first channel at a dispensing end of the multi-layer slot die, the first channel being defined by an upper surface of an upper body member being spaced apart from an upper center surface of a center body member, and dispensing the second fluid through a second opening in a second channel at the dispensing end of the multi-layer slot die, the second channel being defined by a lower surface of a lower body member being spaced apart from a lower center surface of the center body member. The upper body member has an upper rear surface, the lower body member has a lower rear surface, and the center body member has a center rear surface. The first and second openings are substantially parallel to the upper rear surface, the lower rear surface, and the center rear surface.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DETAILED DESCRIPTION

A multi-layer slot die for coating a moving substrate (not shown), such as plastic film, release liner, paper, and other types of substrates, is described. Unlike prior dies, the multi-layer slot die described herein minimizes operator time to align, adjust, or orient the multi-layer slot die after the width of the slot is adjusted as the opening of the slots are substantially vertical and parallel.

Figure 1A:
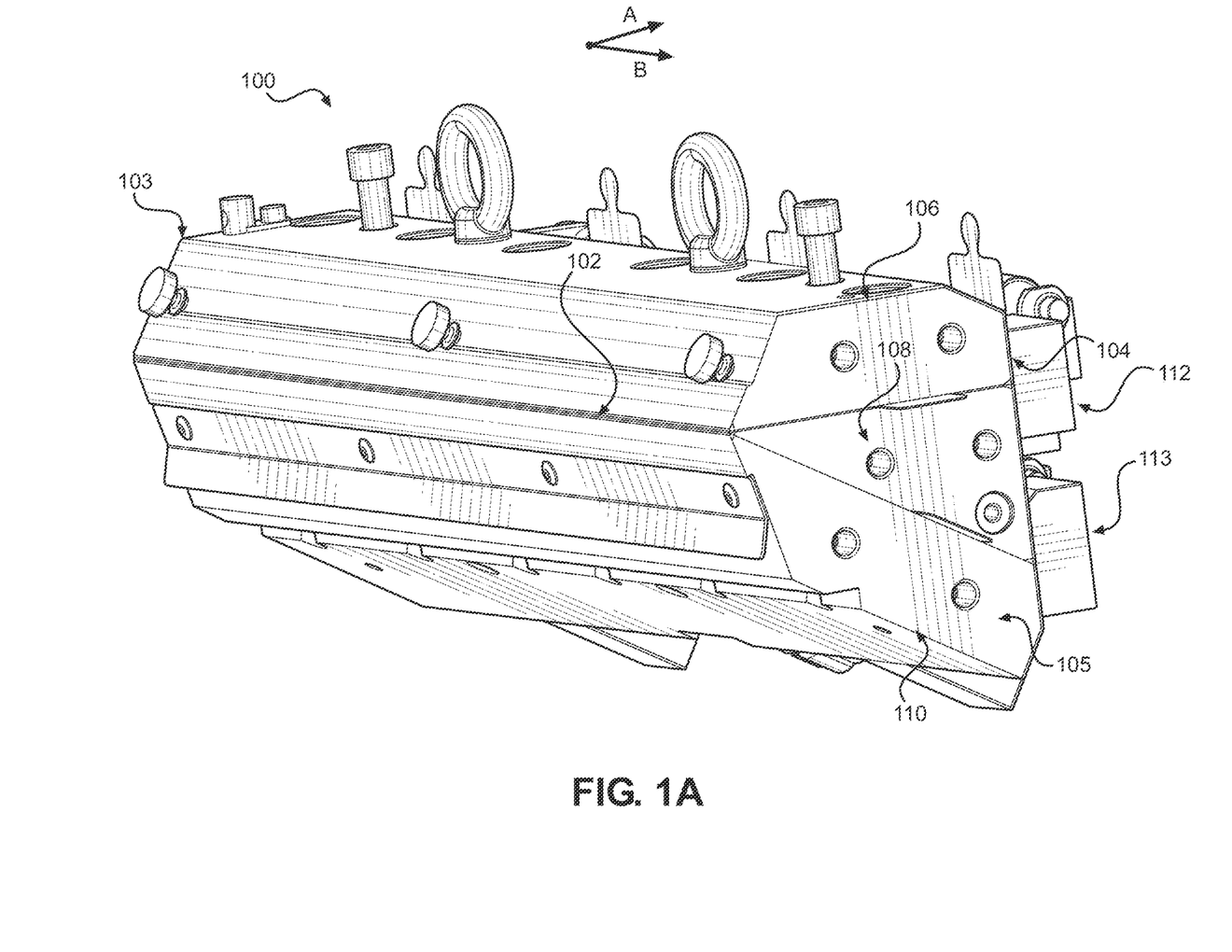
FIG. 1A illustrates a front perspective view of a multi-layer slot die, according to an aspect of this disclosure.
Figure 1B:
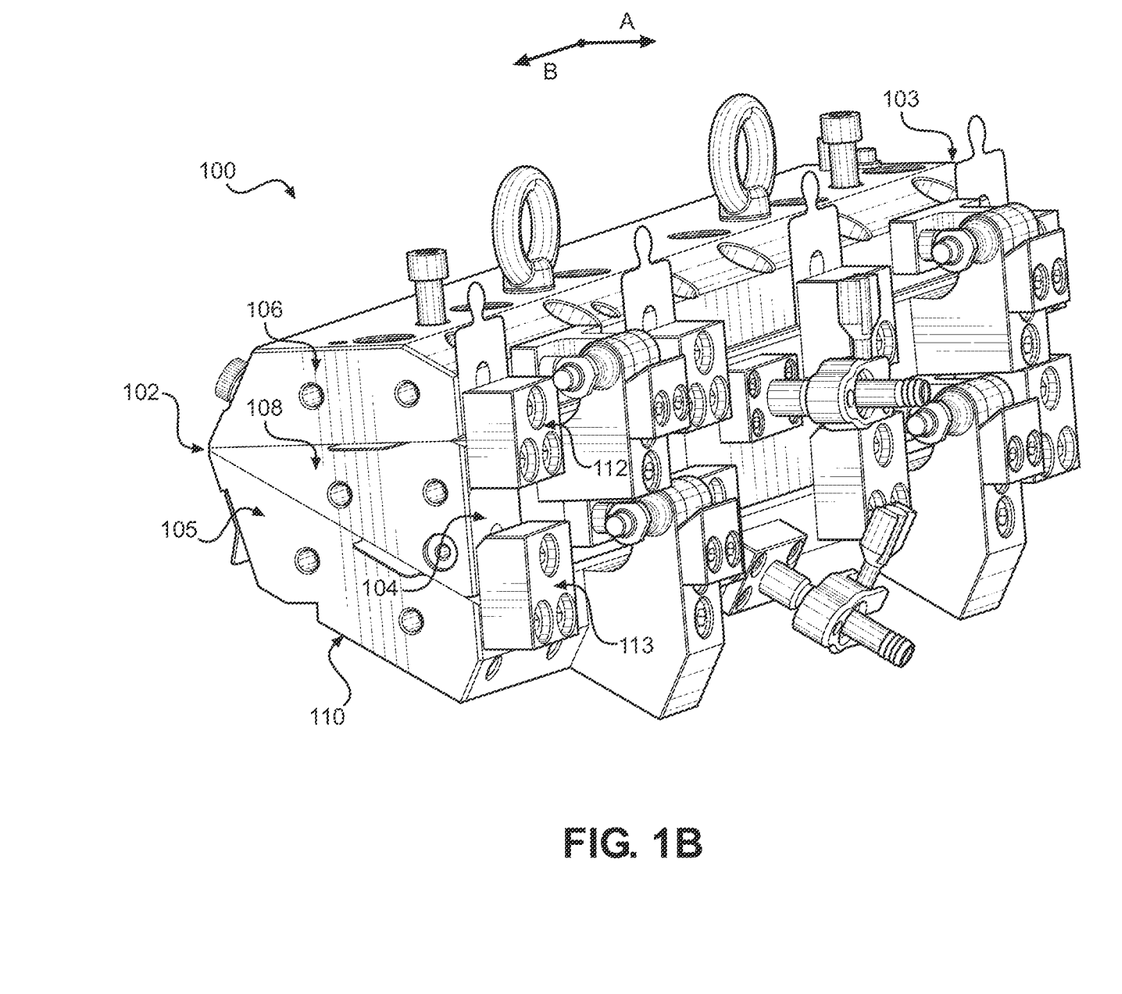
FIG. 1B illustrates a rear perspective view of the multi-layer slot die shown in FIG. 1.

More particularly, FIGS. 1A and 1B provide front and rear perspective views, respectively, of a multi-layer slot die 100. The multi-layer slot die 100 includes a dispensing end 102, a back end 104 spaced apart from the dispensing end in a first direction A, a left side 103, and a right side 105 spaced from the left side 103 in a second direction B. The first direction A may be referred to as an "axial" direction, and the second direction B may be referred to as a "transverse" direction. The dispensing end 102 is configured to apply a fluid coating to the substrate. The coating may include organic or inorganic solvents and water-based coating, dies, slurries, paint, hard coating, UV curable, adhesives, or still other fluids. Alternatively, the coating may be used without a solvent (e.g., be 100 percent solid). The multi-layer slot die 100 may be supported by a base, floor mount, table top, or other support structure (not shown) to align the slot die 100 with the substrate. In an aspect, the substrate may pass over a coating roll 50 (see FIGS. 6A-6C) positioned adjacent to the dispensing end 102 during an application of coating onto the substrate.

Certain terminology is used in the description for convenience only and is not limiting. The words "proximal" and "distal" generally refer to positions or directions toward and away from, respectively, an individual operating a cartridge assembly. The words "axial," "vertical," "transverse," "left," "right," "above," and "below" designate directions in the drawings to which reference is made. The term "substantially" is intended to mean considerable in extent or largely but not necessarily wholly that which is specified. The terminology includes the above-listed words, derivatives thereof and words of similar import.

Figure 5:
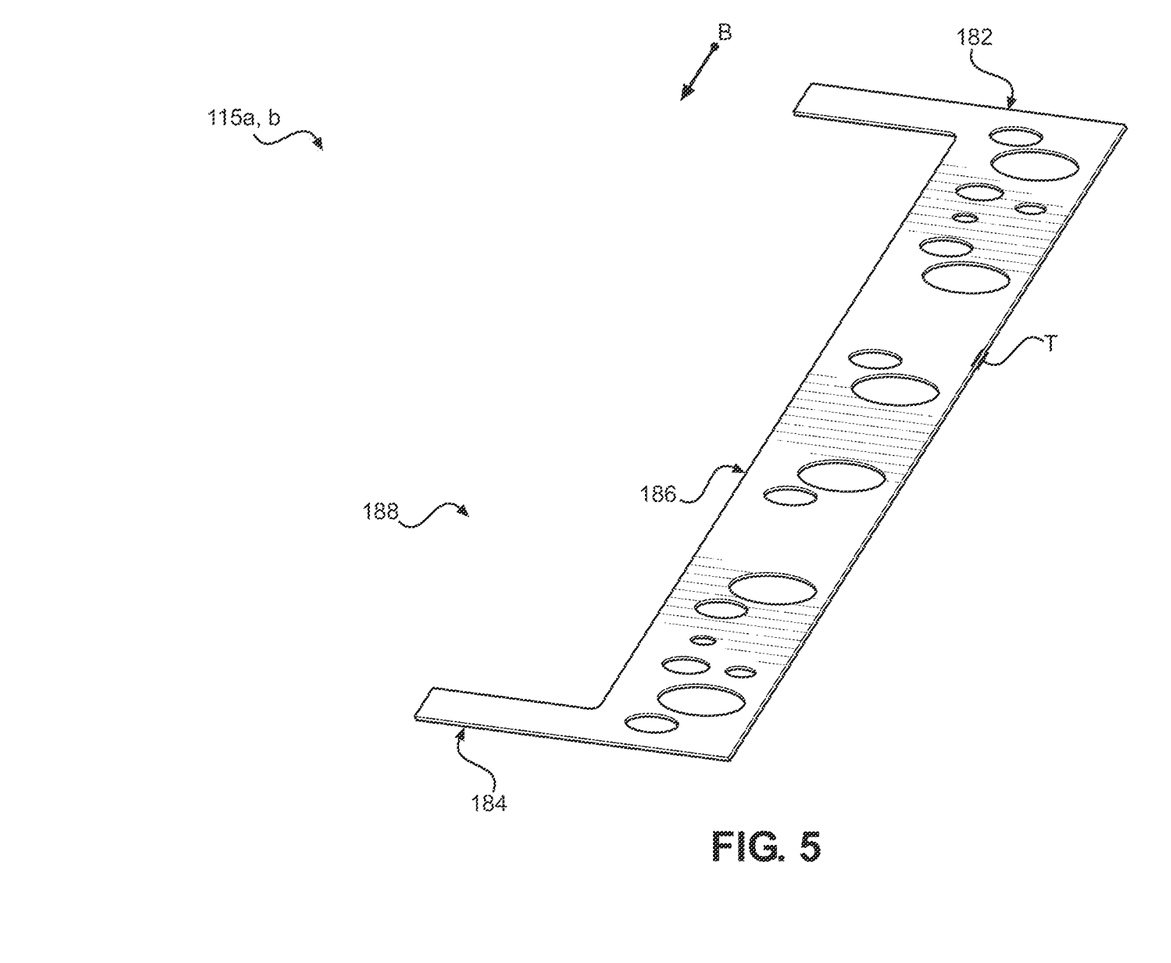
FIG. 5 illustrates a perspective view of a shim member, according to an aspect of this disclosure.

The multi-layer slot die 100 includes an upper body member 106, a center body member 108, a lower body member 110, a first offset block 112, a second offset block 113, and at least one shim 115*a,b* (see FIG. 5). In some embodiments, the offset blocks 112 and 113 can be offset surfaces that are not bolted to the slot die 100. The slot die 100 may also include locking hinges, adapter fluid inlets, or other components commonly used in slot dies. The upper body member 106, the center body member 108, and the lower body member 110 may preferably be manufactured from stainless steel. Alternatively, the upper body member 106, the center body member 108, and the lower body member 110 may be manufactured from titanium, aluminum, special alloys, or other material having a high dimensional stability. It will be appreciated that the slot die 100 may include more body members, such as multiple center body members (e.g., triple layer dies) configured to provide coatings with three or more layers.

Figure 2:
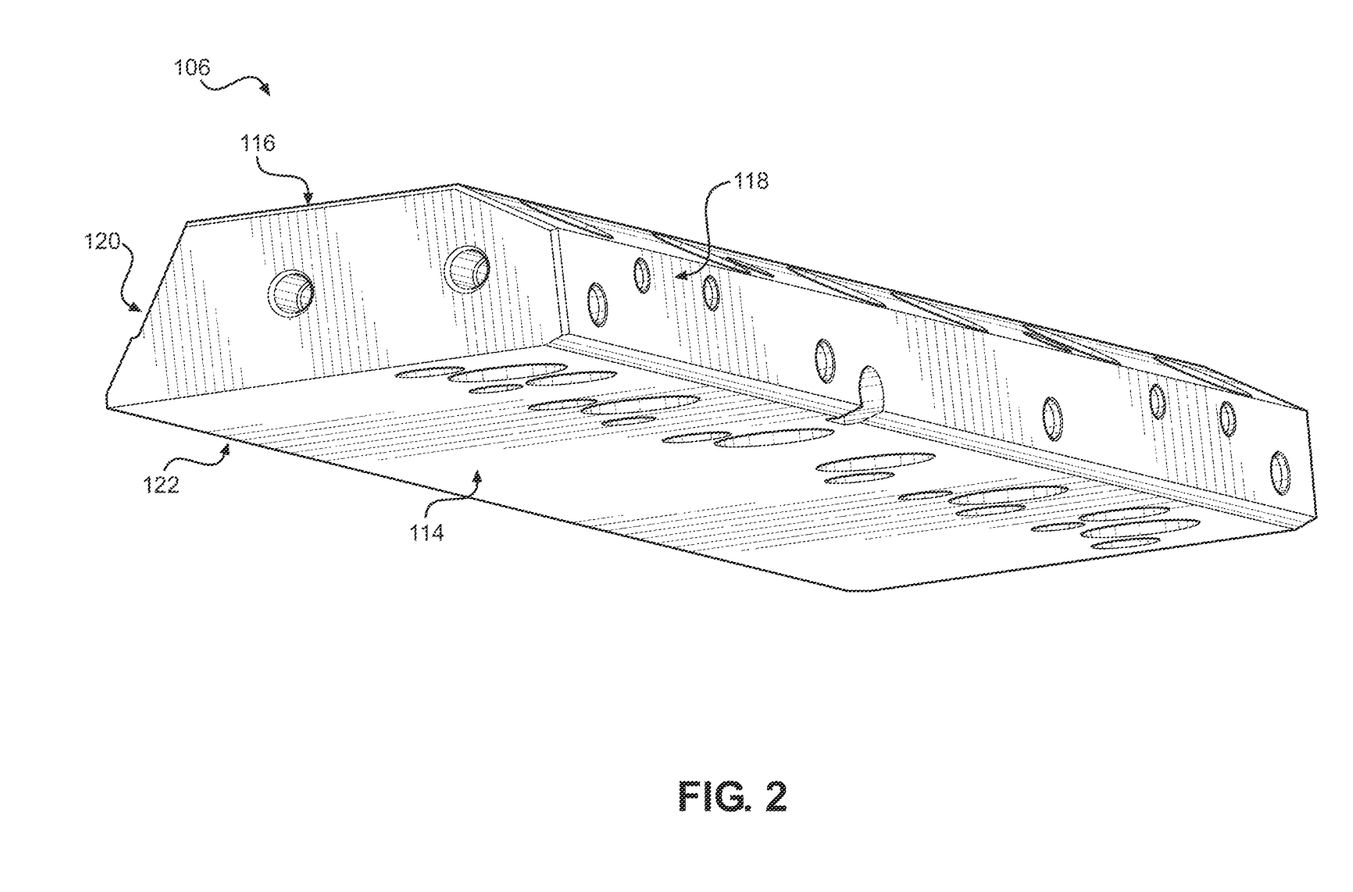
FIG. 2 illustrates a perspective view of an upper body member of the slot die shown in FIG. 1.

FIG. 2 illustrates a perspective view of the upper body member 106. The upper body member 106 is positioned above the center body member 108. The upper body member 106 includes an upper body surface 114, a top surface 116 opposing the upper body surface 114, an upper rear surface 118, and an upper front surface 120 opposing the upper rear surface 118. The upper rear surface 118 defines a portion of the back end 104 of the slot die 100, and a bottom edge 122 of the upper front surface 120 defines a portion of the dispensing end 102. The bottom edge 122 is adjacent to the upper body surface 114. The upper body surface 114 extends from the bottom edge 122 of the upper front surface 120 to the upper rear surface 118, forming a substantially planar surface.

Figure 3A:
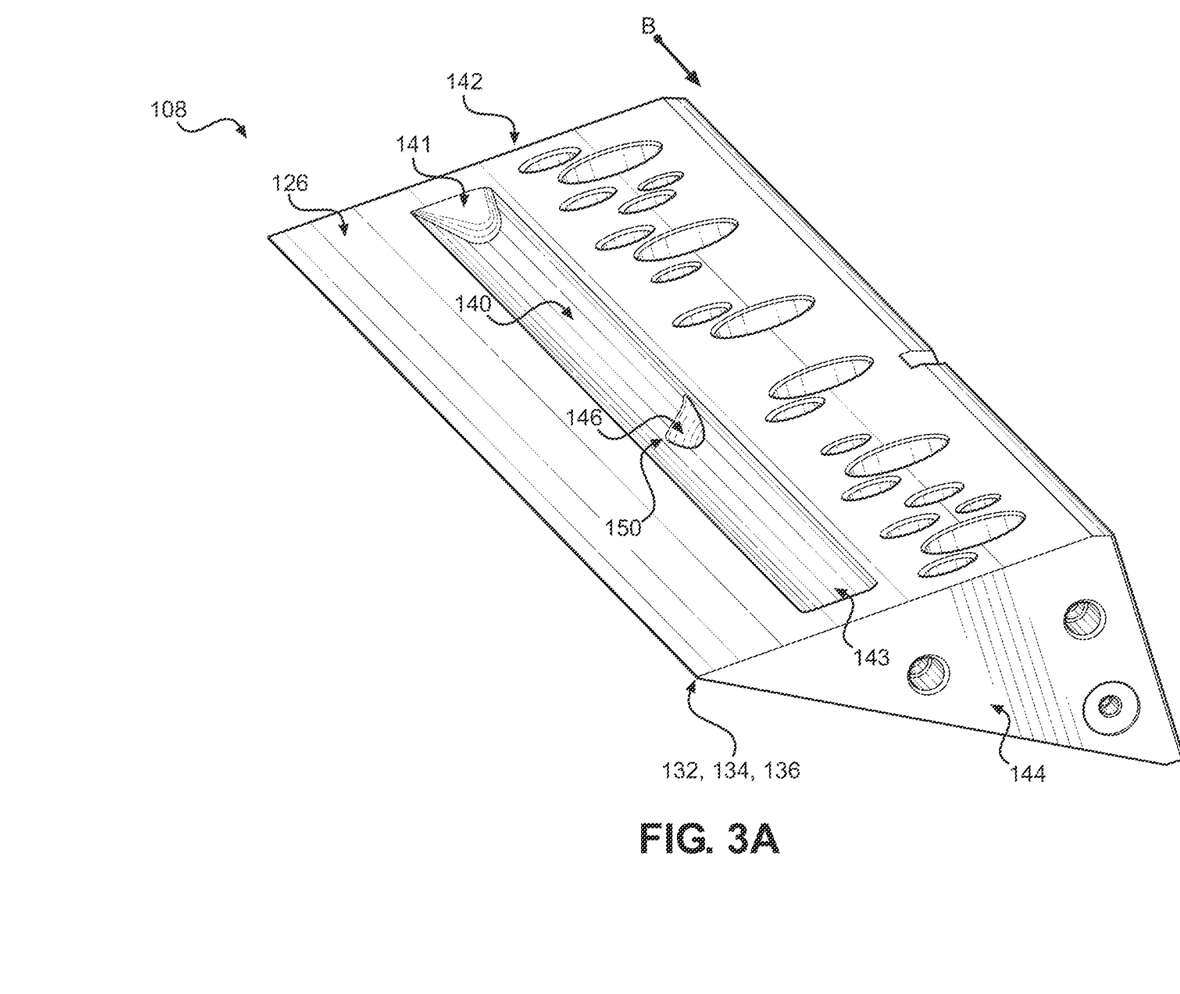
FIGS. 3A and 3B illustrate perspective views of a center body member of the slot die shown in FIG. 1.
Figure 3B:
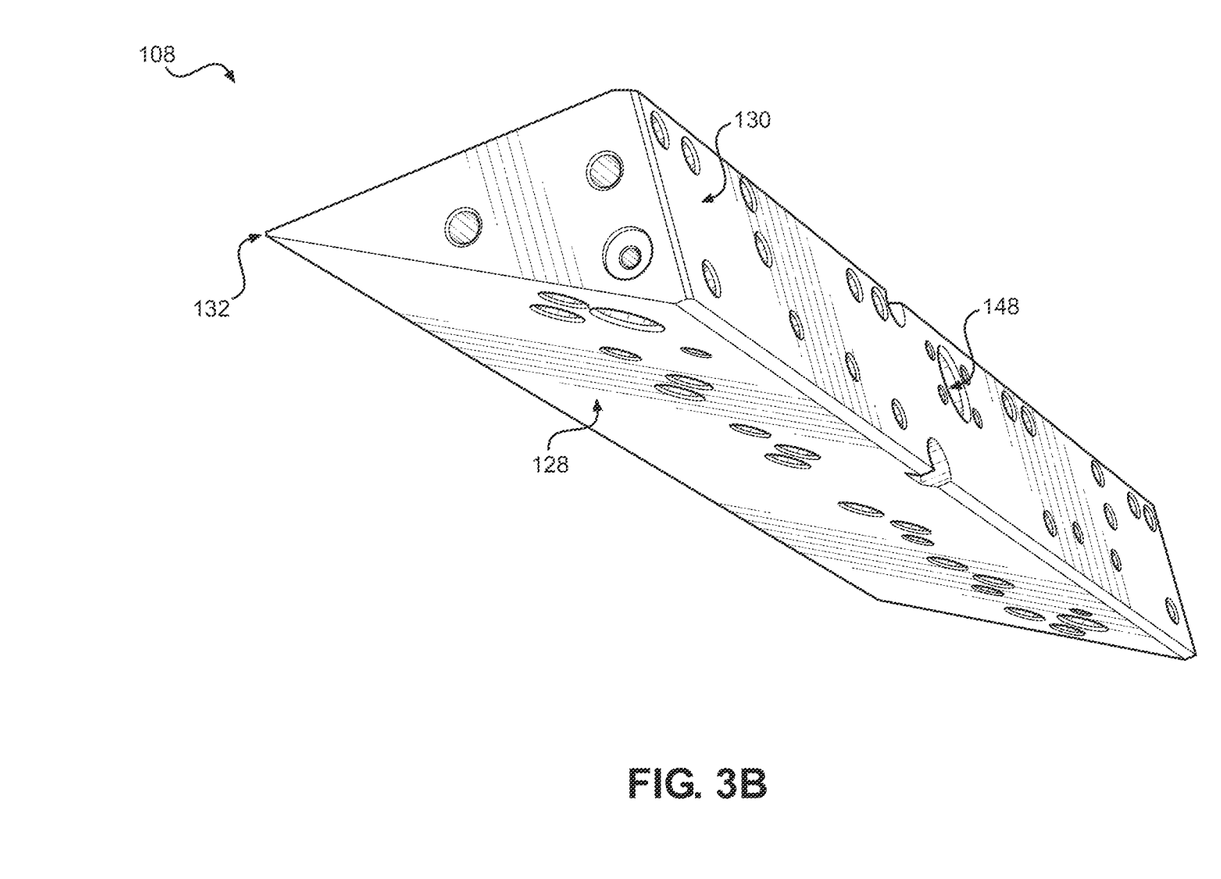

FIGS. 3A and 3B illustrate a top perspective view and a bottom perspective view of the center body member 108, respectively. The center body member 108 is positioned below the upper body member 106, and at least partially between the upper body member 106 and the lower body member 110. The center body member 108 includes an upper center surface 126, a lower center surface 128, a center rear surface 130, and a center front surface 132 opposing the center rear surface 130. The center rear surface 130 defines a portion of the back end 104 of the slot die 100, and the center front surface 132 defines a portion of the dispensing end 102. The upper center surface 126 extends from the center rear surface 130 to an upper center edge 134 of the center front surface 132, forming a substantially planar surface. The lower center surface 128 extends from the center rear surface 130 to a lower center edge 136 of the center front surface 132, forming a substantially planar surface.

The upper center surface 126 defines a center cavity 140 that extends in a transverse direction B' from a first end 141 to a second end 143. The first end 141 is positioned towards a left end 142 of the center body member 108, and the second end 143 is positioned towards a right end 144 of the center body member 108. In an aspect, the first and second ends 141 and 143 of the center cavity 140 are spaced from their respective left and right ends 142 and 144 of the center body member 108 by a substantially equal distance, such that the center cavity 140 is positioned in the middle of the center body member 108 in the transverse direction B'. The center cavity 140 is formed within the center body member 108, and is spaced between the upper center edge 134 of the center front surface 132 and the center rear surface 130. The center cavity 140 may also be referred to as a "distribution chamber."

The center body member 108 defines a center port channel 146 that extends through the center body member 108 from a first port opening 148 to a second port opening 150. The first port opening 148 opens to the center rear surface 130, and the second port opening 150 opens to the center cavity 140. The center port channel 146 may have a curvilinear shape along its length. In an aspect, a diameter of the first port opening 148 is substantially similar to a diameter of the second port opening 150. In another alternative aspect, the center port channel 146 may have a substantially uniform diameter, such that an inner port surface (not labeled) that defines the center port channel 146 is spaced equidistant along a length of the inner port surface from a center port line (not labeled) that extends through a center of the center port channel 146 from the first port opening 148 to the second port opening 150.

The second port opening 150 opens at a center of the center cavity 140 between the left end 142 and the right end 144 of the center body member 108. In an alternative aspect, the second port opening 150 may open at a location different from the center of the center cavity 140. In a further alternative aspect, the center body member 108 may define more than one center port channel 146, such that multiple port channels extend from the center rear surface 130 to the center cavity 140.

Figure 4:
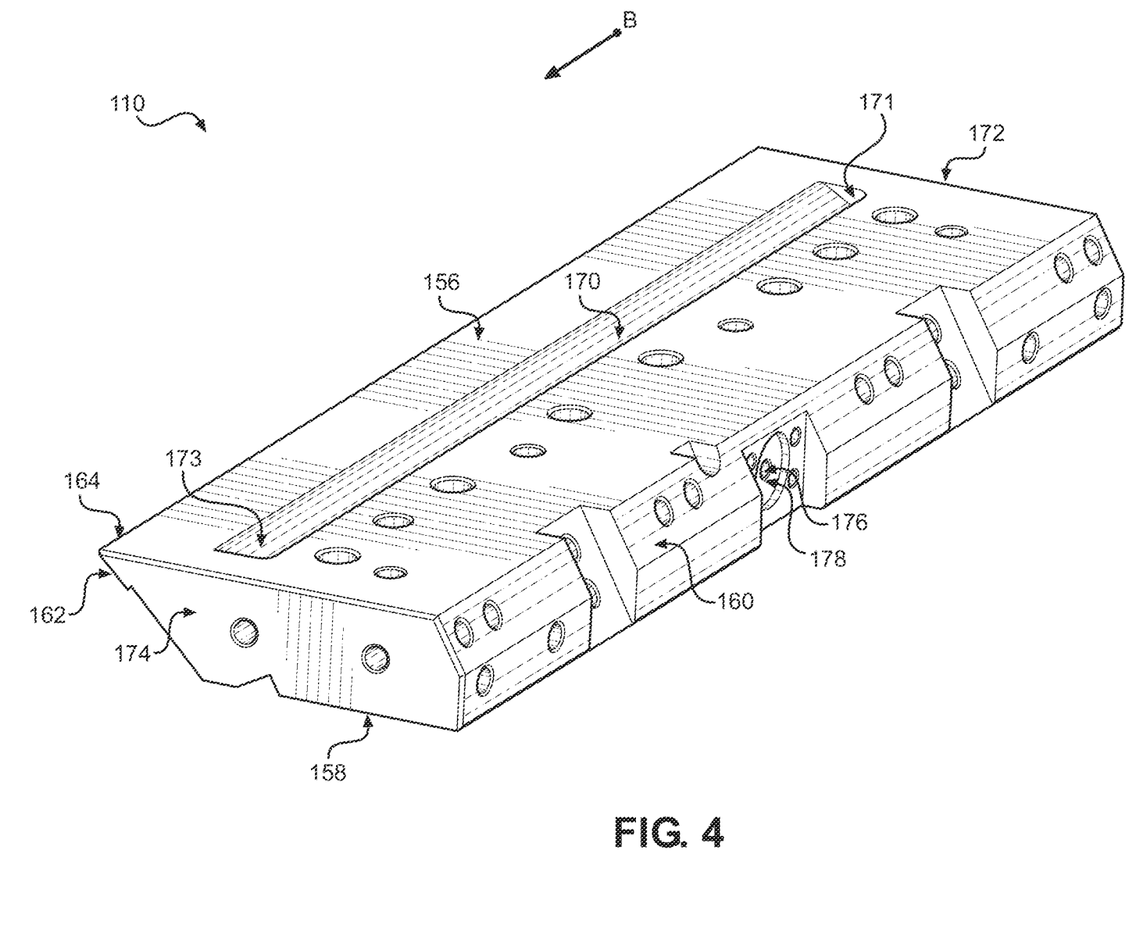
FIG. 4 illustrates a perspective view of a lower body member of the slot die shown in FIG. 1.

FIG. 4 illustrates a perspective view of the lower body member 110. The lower body member 110 is positioned below the center body member 108. The lower body member 110 includes a lower surface 156, a bottom surface 158 opposing the lower surface 156, a lower rear surface 160, and a lower front surface 162 opposing the lower rear surface 160. The lower rear surface 160 defines a portion of the back end 104 of the slot die 100, and a top edge 164 of the lower front surface 162 defines a portion of the dispensing end 102. The top edge 164 is adjacent to the lower surface 156. The lower surface 156 extends from the top edge 164 of the lower front surface 162 to the lower rear surface 160, forming a substantially planar surface.

The lower body member 110 defines a lower cavity 170 that extends in a transverse direction B" from a first end 171 to a second end 173. The first end 171 of the lower cavity 170 is positioned towards a left end 172 of the lower body member 110, and the second end 173 of the lower cavity 170 is positioned towards a right end 174 of the lower body member 110. In an aspect, the first and second ends 171 and 173 of the lower cavity 170 are spaced from their respective left and right ends 172 and 174 of the lower body member 110 by a substantially equal distance, such that the lower cavity 170 is positioned in the middle of the lower body member 110 in the transverse direction B". The lower cavity 170 is formed within the lower body member 110, and is spaced between the top edge 164 of the lower front surface 162 and the lower rear surface 160. The lower cavity 170 may also be referred to as a "distribution chamber."

The lower body member 110 defines a lower port channel 176 that extends through the lower body member 110 from a first lower port opening 178 to a second lower port opening (not visible in figures). The first lower port opening 178 opens to the lower rear surface 160, and the second lower port opening opens to the lower cavity 170. The lower port channel 176 may include any of the configurations as described with respect to the center port cavity 140, including the position of the channel, the shape of the channel, and number of channels.

Referring to FIGS. 1A and 1B, the first offset block 112 is positioned adjacent to the upper body member 106 and the center body member 108 in the axial direction A. A contact surface of the first offset block 112 is coupled to the center rear surface 130 of the center body member 108, and the contact surface of the first offset block 112 is spaced apart from the upper rear surface 118 of the upper body member 106 by an upper offset distance. The second offset block 113 is positioned adjacent to the center body member 108 and the lower body member 110 in the axial direction A. A contact surface of the second offset block 113 is coupled to the lower rear surface 160 of the lower body member 110, and the contact surface of the second offset block 113 i spaced apart from the center rear surface 130 of the upper body member 106 by a lower offset distance. The contact surfaces of the first offset block 112 and the second offset block 113 is substantially parallel to the upper rear surface 118, the center rear surface 130, and the lower rear surface 160. In an aspect, the upper offset distance may be substantially equivalent to the lower offset distance.

FIG. 5 illustrates a perspective view of the at least one shim 115a,b. The at least one shim 115a,b extends in a transverse direction B''' from a left end 182 to a right end 184. Multiple shims 115a,b may be included in the slot die 100 and are positioned in between the upper center surface 126 of the center body member 108 and the upper body surface 114 of the upper body member 106, and in between the lower surface 156 of the lower body member 110 and the lower center surface 128 of the center body member 108. For descriptive purposes, shim "115a" may refer to the shim positioned between the upper body member 106 and the center body member 108, and shim "115b" may refer to the shim positioned between the center body member 108 and the lower body member 110.

The left end 182 of each shim 115a, b is positioned to align with the left side 103 of the slot die 100, and the right end 184 is positioned to align with the right side 105 of the slot die 100. Each of the shims 115a, b may have a uniform thickness T, such that an upper surface of each shim 115a, b is substantially parallel to a lower surface of each shim 115. The upper surface and the lower surface of the shim 115a are positioned to contact the upper body surface 114 and the upper center surface 126, respectively. The shim 115a defines a first spacing between the upper body surface 114 and the upper center surface 126. Similarly, the upper surface and lower surface of shim 115b are positioned to contact the lower center surface 128 and the lower surface 156, respectively. Shim 115b defines a second spacing between the lower center surface 128 and the lower surface 156. Each of the shims 115a,b may have a different uniform thickness T, whereby a size of the first spacing is different from a size of the second spacing. For example, the shim 115a positioned between the upper body surface 114 and the upper center surface 126 may have a thickness T of 0.020 inches, and the shim 115b positioned between the lower surface 156 and the lower center surface 128 may have a thickness T of 0.010 inches. The thickness T of shim 115a defines the size of the first spacing to be 0.020 inches, and the thickness T of the shim 115b defines the size of the second spacing to be 0.010 inches.

Each shim 115a,b defines a shim cutout 186 that extends through each shim 115a,b from the upper surface to the lower surface. The shim cutout 186 opens to a shim opening 188. The shim opening 188 defines a portion of the dispensing end 102. The shim cutout 186 of shim 115a is configured to at least partially align with the center cavity 140, and the shim cutout 186 of shim 115b is configured to at least partially align with the lower cavity 170. The alignment of cutout 186 of shim 115a enables fluid communication between the center cavity 140 and the dispensing end 102 via a first channel that extends from the center cavity 140 (e.g. first inlet) to the dispensing end 102, and the alignment of cutout 186 of shim 115b enables fluid communication between the lower cavity 170 and the dispensing end 102 via a second channel that extends from the lower cavity 170 (e.g. second inlet) to the dispensing end 102. The first channel and second channel may be referred to as a "first slot gap" and a "second slot gap," respectively. In an alternative aspect, the slot die 100 may not include any body shims 115a,b and the gaps be defined by space between the members of the slots die 100.

Figure 6A:
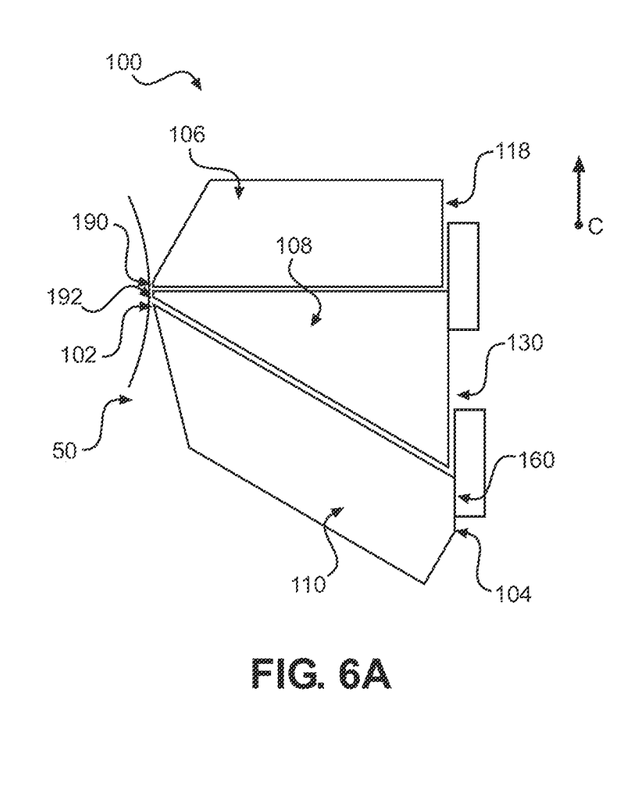
FIGS. 6A through 6C illustrate multiple side views of multiple aspects of a multi-layer slot die.

FIG. 6A illustrates a side view of the slot die 100. The upper body member 106 is positioned above the center body member 108 in a third direction C and aligned with the center body member 108 such that the upper rear surface 118 is substantially parallel to the center rear surface 130. The third direction C may be referred to as a "vertical" direction. The alignment of the upper body member 106 with the center body member 108 forms a first dispense opening 190 between the bottom edge 122 of the upper body member 106 and the upper center edge 134 of the center body member 108. The first dispense opening 190 extends along a plane that is substantially parallel to the vertical direction C.

The center body member 108 is positioned above the lower body member 110 in the vertical direction C and aligned with the lower body member 110 such that the center rear surface 130 is substantially parallel with the lower rear surface 160. The alignment of the center body member 108 with the lower body member 110 forms a second dispense opening 192 between the lower center edge 136 of the center body member 108 and the top edge 164 of the lower body member 110. The second dispense opening 192 extends along a plane that is substantially parallel to the vertical direction C.

The first and second dispense openings 190 and 192 define a portion of the dispensing end 102, referred to as a "lip face." The first dispense opening 190 is in fluid communication with the first port opening 148 of the center body member 108 via the center port channel 146, the center cavity 140, and the first slot gap. The second dispense opening 192 is in fluid communication with the first lower port opening 178 of the lower body member 110 via the lower port channel 176, the lower cavity 170, and the second slot gap.

A method for using the slot die 100 for dispensing a first fluid through the first dispense opening 190 and a second fluid through the second dispense opening 192 commences by aligning the upper body member 106, the center body member 108, and the lower body member 110. The upper body member 106 is raised above the center body member 108 in the vertical direction C and the shim 115a is placed on top of the 126 of the center body member 108. The upper body member 106 is lowered onto the shim 115a until the upper body surface 114 of the upper body member 106 is in contact with the upper surface of the shim 115a. The center body member 108 is raised above the lower body member 110 in the vertical direction C and the shim 115b is placed on top of the lower surface 156 of the lower body member 110. The center body member 108 is lowered onto the shim 115b until the lower center surface 128 is in contact with the upper surface of the shim 115b. The thickness T of each shim 115a, b may be selected based on a desired amount of the first and second fluids to dispense. Once each of the body members 106, 108, and 110 is aligned, the first and second dispense openings 190 and 192 extend along a plane that is substantially parallel to the vertical direction C, and the upper rear surface 118 is substantially parallel to the center rear surface 130, and the center rear surface 130 is substantially parallel to the lower rear surface 160. In an aspect, the upper rear surface 118, the center rear surface 130, and the lower rear surface 160 are all be substantially parallel. In a further aspect, each of the rear surfaces 118, 130, and 160 are parallel to the first and second dispense openings 190 and 192.

The first and second offset blocks 112 and 113 are coupled to the center rear surface 130 and the lower rear surface 160. One or more uniform operating pumps (not shown) may be coupled to the first port opening 148 of the center body member 108 and to the first lower port opening 178 of the lower body member 110. The uniform operating pump may be configured to deliver an exact volume of fluid through the slot die 100 to the first and second dispense openings 190 and 192 to maintain a desired wet film thickness on the substrate being coated. It will be appreciated that the uniform operating pump may be configured to operate at a variety of speeds, apply a variety of different coating thicknesses, and use a variety of different coating fluids.

When the thickness of either the first or second fluid needs to be adjusted to a new desired thickness, for example, for coating a new or different substrate, the shims 115a,b may be removed and replaced with a new shim that defines the new desired thickness. A benefit of the slot die 100 is that after a new shim is positioned within the slot die 100, the first and second dispense openings 190 and 192 remain extended along the plane that is substantially parallel to the vertical direction C. This minimizes operator time to align, adjust, or orient the slot die 100 with the substrate. Additionally, the upper rear surface 118 remains substantially parallel to the center rear surface 130, and the center rear surface 130 remains substantially parallel to the lower rear surface.

Figure 6B:
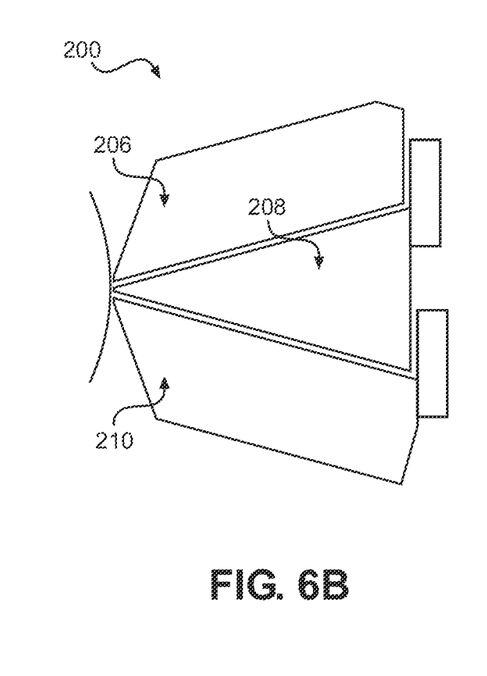

FIG. 6B illustrates a side view of a slot die 200. The slot die 200 includes an upper body member 206, a center body member 208, and a lower body member 210. Portions of the upper body member 206, the center body member 208, and the lower body member 210 include similar features and configurations as the upper body member 106, the center body member 108, and the lower body member 110, respectively, of the slot die 100 described above. Slot die 200 illustrates alternate cross sections for the upper body member 206, the center body member 208, and the lower body member 210, whereby the first and second dispense openings 190 and 192 remain extending along a plane that is substantially parallel to the vertical direction C when a new shim is placed in the slot die 200.

Figure 6C:
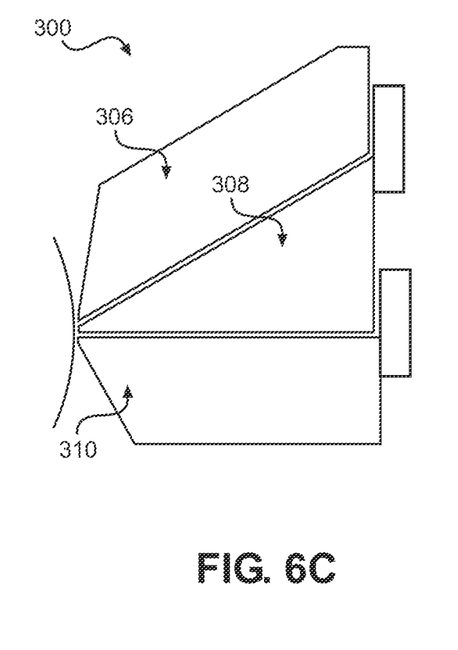

FIG. 6C illustrates a side view of a slot die 300. The slot die 300 includes an upper body member 306, a center body member 308, and a lower body member 310. Portions of the upper body member 306, the center body member 308, and the lower body member 310 include similar features and configurations as the upper body member 106, the center body member 108, and the lower body member 110, respectively, of the slot die 100 described above. Slot die 300 illustrates additional alternate cross sections for the upper body member 306, the center body member 308, and the lower body member 310, whereby the first and second dispense openings 190 and 192 remain extending along a plane that is substantially parallel to the vertical direction C when a new shim is placed in the slot die 300.

Although reference was made to the slot die 100 in the above described example for using the slot die 100, similar methods may also be employed by the slot dies 200 and 300.

These specific embodiments described above are for illustrative purposes and are not intended to limit the scope of the disclosure as otherwise described and claimed herein. Modification and variations from the described embodiments exist. The scope of the invention is defined by the appended claims.

What is claimed is:

1. A multi-layer slot die, comprising:
a center body member having an upper center surface, a lower center surface, and a center rear surface;
an upper body member adjustably coupled to the center body member, the upper body member having an upper surface and an upper rear surface, the upper surface being spaced apart from the upper center surface forming a first channel therebetween, the first channel including a first opening at a dispensing end of the multi-layer slot die configured to dispense a first fluid and a first inlet spaced apart from the dispensing end, the upper body member being configured to move between a first position and a second position, wherein in the first position the upper surface is spaced apart from the upper center surface by a first distance, and wherein in the second position the upper surface is spaced apart from the upper center surface by a second distance that is different from the first distance, wherein the first opening is substantially parallel to both the center rear surface and the upper rear surface in both the first and second positions of the upper body member;
a lower body member adjustably coupled to the center body member, the lower body member having a lower surface and a lower rear surface, the lower surface being spaced apart from the lower center surface forming a second channel therebetween, the second channel including a second opening at the dispensing end configured to dispense a second fluid and a second inlet spaced apart from the dispensing end, the second opening being substantially parallel to the first opening and the lower rear surface in both the first and second positions of the upper body member;
a first offset block coupled to the center rear surface, the first offset block being spaced apart from the upper rear surface; and
a second offset block coupled to the lower rear surface, the second offset block being spaced apart from the center rear surface.

2. The multi-layer slot die of claim 1, wherein the lower body member is configured to move between a first position and a second position, wherein in the first position the lower surface is spaced apart from the lower center surface by a first lower distance, and wherein in the second position the lower surface is space apart from the lower center surface by a second lower distance that is different from the first lower distance, wherein the second opening is substantially parallel to the center rear surface, the upper rear surface, and the lower rear surface in both the first and second positions of the lower body member.

3. The multi-layer slot die of claim 2, further comprising:
a first upper shim positioned within the first channel when the upper body member is in the first position, the first upper shim having a first upper thickness; and
a second upper shim positioned within the first channel when the upper body member is in the second position, the second upper shim having a second upper thickness that is different from the first upper thickness.

4. The multi-layer slot die of claim 3, further comprising:
a first lower shim positioned within the second channel when the lower body member is in the first position, the first lower shim having a first lower thickness; and
a second lower shim positioned within the second channel when the lower body member is in the second position, the second lower shim having a second lower thickness that is different from the first lower thickness.

5. The multi-layer slot die of claim 1, wherein the upper surface of the upper body member is adjacent to the upper rear surface of the upper body member, and wherein the lower surface of the lower body member is adjacent to the lower rear surface of the lower body member.

6. The multi-layer slot die of claim 1, wherein the upper rear surface, the lower rear surface, and the center rear surface define a back end of the multi-layer slot die, wherein the back end is spaced apart from the dispensing end in a first direction.

7. The multi-layer slot die of claim 6, wherein the upper rear surface is positioned between the center rear surface and the dispensing end in the first direction, and wherein the center rear surface is positioned between the lower rear surface and the dispensing end in the first direction.

8. A multi-layer slot die, comprising:
an upper body member having an upper surface and an upper rear surface;
a lower body member having a lower surface and a lower rear surface;
a center body member adjustably coupled to both of the upper body member and the lower body member, the center body member being positioned at least partially between the upper body member and the lower body member, the center body member having an upper center surface, a lower center surface, and a center rear surface, the upper center surface being spaced apart from the upper surface of the upper body member forming a first channel therebetween, the lower center surface being spaced apart from the lower surface of the lower body member forming a second channel therebetween;
a first offset block coupled to the center rear surface, the first offset block being spaced apart from the upper rear surface; and
a second offset block coupled to the lower rear surface, the second offset block being spaced apart from the center rear surface,
wherein the first channel includes a first opening at a dispensing end of the multi-layer slot die configured to dispense a first fluid and a first inlet spaced apart from the dispensing end, and wherein the second channel includes a second opening at the dispensing end configured to dispense a second fluid and a second inlet spaced apart from the dispensing end, and wherein the first and second openings are substantially parallel to the upper rear surface, the lower rear surface, and the center rear surface.

9. The multi-layer slot die of claim 8, wherein the upper surface of the upper body member is adjacent to the upper rear surface of the upper body member, and wherein the lower surface of the lower body member is adjacent to the lower rear surface of the lower body member.

10. The multi-layer slot die of claim 8, wherein the center rear surface is positioned between and adjacent to the upper center surface and the lower center surface.

11. The multi-layer slot die of claim 8, wherein the upper rear surface, the lower rear surface, and the center rear surface define a back end of the multi-layer slot die, wherein the back end is spaced apart from the dispensing end in a first direction.

12. The multi-layer slot die of claim 11, wherein the upper rear surface is positioned between the center rear surface and the dispensing end in the first direction, and wherein the center rear surface is positioned between the lower rear surface and the dispensing end in the first direction.

13. The multi-layer slot die of claim 12, wherein the first offset block is spaced apart from the upper rear surface in the first direction; and wherein the second offset block is spaced apart from the center rear surface in the first direction.

14. The multi-layer slot die of claim 8, wherein the upper center surface is substantially parallel to the upper surface of the upper body member, and wherein the lower center surface is substantially parallel the lower surface of the lower body member.

15. The multi-layer slot die of claim 1, wherein the first offset block is spaced apart from the upper rear surface in a first direction, and wherein the second offset block is spaced apart from the center rear surface in the first direction.

16. The multi-layer slot die of claim 15, wherein the upper rear surface is positioned between the center rear surface and the dispensing end in the first direction, and wherein the center rear surface is positioned between the lower rear surface and the dispensing end in the first direction.

* * * * *